(12) United States Patent
Doglio

(10) Patent No.: US 10,641,293 B2
(45) Date of Patent: May 5, 2020

(54) FAN SUSPENSION SYSTEM TO PROVIDE VIBRATION ISOLATION, SECURE MOUNTING, AND THERMAL SEAL

(71) Applicant: Dell Products L.P., Round Rock, TX (US)

(72) Inventor: Jean M. Doglio, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 15/270,161

(22) Filed: Sep. 20, 2016

(65) Prior Publication Data

US 2018/0080480 A1 Mar. 22, 2018

(51) Int. Cl.
*F04D 29/66* (2006.01)
*G06F 1/20* (2006.01)
*F04D 29/60* (2006.01)

(52) U.S. Cl.
CPC ......... *F04D 29/668* (2013.01); *F04D 29/601* (2013.01); *G06F 1/20* (2013.01)

(58) Field of Classification Search
CPC .. F04D 29/668; F04D 29/5853; F04D 29/325; F04D 29/646; F04D 29/522; G06F 1/20
See application file for complete search history.

(56) References Cited

U.S. PATENT DOCUMENTS

| 8,075,248 B2* | 12/2011 | Yin ..................... H05K 7/20172 248/562 |
| 8,953,329 B1 | 2/2015 | Heydari |
| 9,723,751 B2* | 8/2017 | Doglio ............... H05K 7/20172 |
| 2004/0120114 A1* | 6/2004 | Feldmeyer ............ F04D 29/646 361/695 |
| 2004/0135439 A1* | 7/2004 | White ................... F04D 29/668 310/51 |
| 2012/0195738 A1* | 8/2012 | Chan .................. H05K 7/20172 415/119 |
| 2013/0228669 A1* | 9/2013 | Liu ..................... H05K 7/20172 248/674 |
| 2014/0205437 A1 | 7/2014 | Zhu et al. |
| 2014/0234100 A1* | 8/2014 | Hamaguchi ........... F04D 29/646 415/213.1 |
| 2014/0252197 A1* | 9/2014 | Doglio ............... H05K 7/20172 248/562 |

* cited by examiner

*Primary Examiner* — Patrick Hamo
*Assistant Examiner* — David N Brandt
(74) *Attorney, Agent, or Firm* — Terrile, Cannatti & Chambers; Stephen A. Terrile

(57) ABSTRACT

A fan isolation system comprising: a fan isolation assembly attached to a fan, the fan isolation assembly comprising a mechanical isolation portion, the mechanical isolation portion comprising an isolation spring element, the mechanical isolation portion performing a vibration isolation function for the fan isolation assembly; and, a thermal duct portion, the thermal duct portion being configured to fit within the mechanical isolation portion, the thermal duct portion performing a thermal sealing function for the fan isolation assembly.

18 Claims, 7 Drawing Sheets

FAN SUSPENSION SYSTEM TO PROVIDE VIBRATION ISOLATION, SECURE MOUNTING, AND THERMAL SEAL

BACKGROUND OF THE INVENTION

Field of the Invention

The present invention relates to information handling systems. More specifically, embodiments of the invention relate to a fan suspension system for use with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems, such as server type information handling systems, with high performance components. Additionally, it is known to package these high performance components in compact housings. For example, many server type information handling systems may be configured as individual blades which are mounted in racks. Such configurations can necessitate significant cooling functionality. Accordingly, fans often need to operate at high speed, which in turn can increase vibration associated with the fans. Such vibration can degrade the performance of components in the information handling system such as hard drives, even causing some components to drop offline.

A known solution for reducing fan vibration transmission is to provide a set of grommets (made from rubber or some other isolator material), which are coupled between the fan and a carrier or fan bay. If correctly implemented, the grommets prevent the fan from touching the chassis and limit the vibration that is passed from the fan to the chassis.

SUMMARY OF THE INVENTION

A system, method, and information handling system are disclosed for performing a fan isolation operation. In certain embodiments the fan isolation operation is performed via a fan isolation system. Certain aspects of the disclosed fan isolation system isolate a fan from the information handling system chassis. Certain aspects of the fan isolation system provide a means of securing and retaining the fan in all directions. Certain aspects of the fan isolation system enable control of the fan location. Certain aspects of the fan isolation system provide thermal airflow sealing around the fan. In certain embodiments, the fan isolation system includes a thermal duct portion. In certain embodiments, the thermal duct portion is formed using a thermoplastic resin configured such that air gaps between the fan and the chassis are minimized. In certain embodiments, the thermoplastic resin comprises Polyethylene terephthalate (available under the trade designation of Mylar). In certain embodiments, the thermoplastic resin is folded to minimize air gaps. Such a fan isolation system provides a feasible/stable solution which can resist mechanical shock loads, and movement due to air pressure differentials or rotational inertial forces. In certain embodiments, the fan isolation system further includes a damping portion at the interface between the fan carrier and the chassis to provide additional vibration reduction across the full frequency range. In certain embodiments the damping portion comprises a strip of damping material can be added at the interface between the carrier and chassis In certain embodiments, the fan isolation system is included within a fan module such as a 60 mm fan module used in blade type server information handling systems. In certain embodiments, the fan isolation system is included within a fan module for use in a modular chassis, but could be modified to work in other systems, such as rack server type information handling systems where a fan is designed to fit into a fan bay. Additionally, the fan isolation system can be scaled to different fan shapes & sizes.

Such a fan isolation system provides an option for isolating fans from the chassis, which requires less vertical space, requires fewer parts, and saves in cost compared to grommets plus additional solutions. Additionally, such a fan isolation system integrates thermal sealing into the fan carrier thus reducing assembly complexity and potential for damage.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Certain aspects of the present disclosure include an appreciation that as hard drives become increasingly more sensitive, grommets alone cannot always sufficiently limit vibration to ensure uninterrupted hard drive operation. Certain aspects of the present disclosure include an appreciation that grommets are already a cost adder (e.g., approximately $0.70 per fan), and if additional features are needed to reduce vibration energy, additional cost will be incurred.

Certain aspects of the present disclosure include an appreciation that a factor restricting the effectiveness of a grommet solution is limited vertical space. To achieve maximum vibration isolation, the grommet material should be as flexible as possible. However, using soft, flexible grommets to mount a fan can result in the fan sagging (e.g., up to 1 mm or more). In densely packed chassis assemblies, space is at a premium; frequently, sufficient space to ensure grommet performance is not available. Certain aspects of the present disclosure include an appreciation that in addition to vibration isolation, another important feature to a cooling solution is thermal sealing around the fan to prevent air recirculation or bypass.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
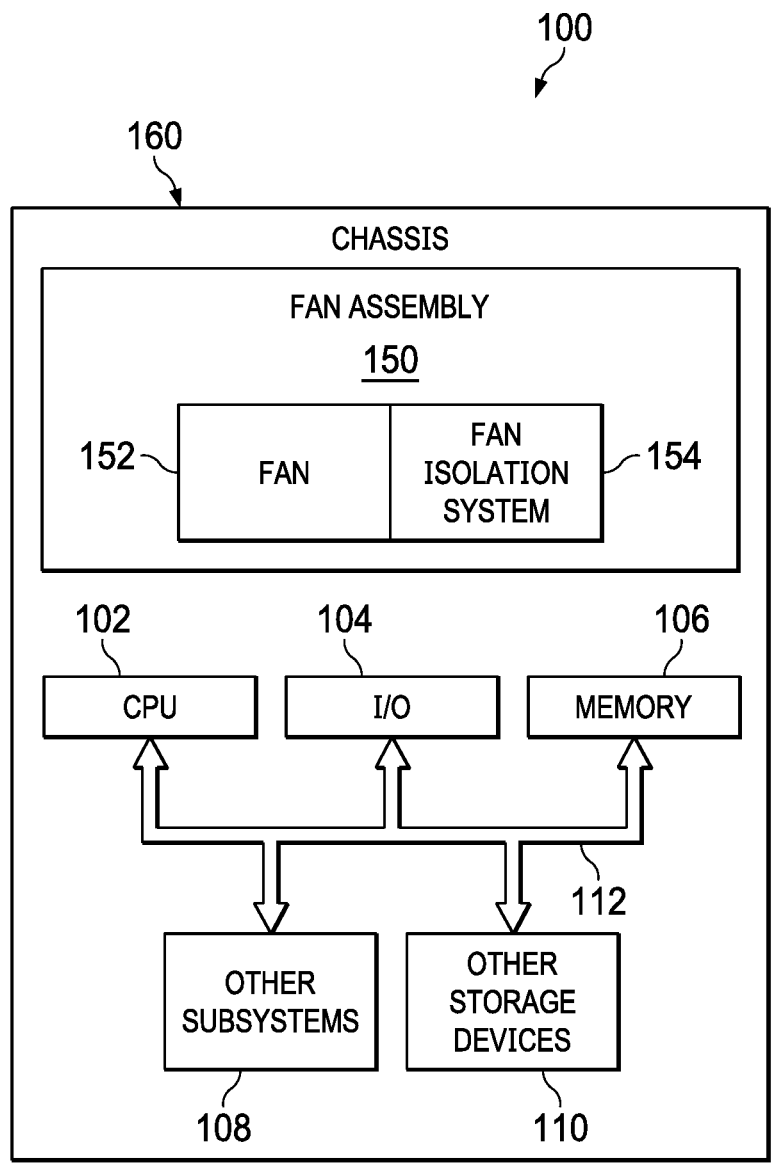
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, memory 106, and various other subsystems 110. The information handling system 100 likewise includes other storage devices 108. The components of the information handling system are interconnected via one or more buses 112. The information handling system further includes a fan assembly 150 which performs a cooling function for the various components (some of which are not necessarily shown in FIG. 1) of the information handling system 100. The fan assembly 150 includes a fan 152 and a fan isolation system 154 which performs a fan isolation operation. The components of the information handling system 100 including the fan assembly 150 are included within an information handling system chassis 160.

Certain aspects of the fan isolation system 154 isolate the fan 152 from the information handling system chassis 160. Certain aspects of the fan isolation system 154 provide a means of securing and retaining the fan 152 in all directions. Certain aspects of the fan isolation system 154 enable control of the fan location (i.e., the position of the fan 152 within the information handling system chassis 160. Certain aspects of the fan isolation system 154 provide thermal airflow sealing around the fan 152. In certain embodiments, the thermoplastic resin is folded to minimize air gaps. Such a fan isolation system 154 provides a feasible and stable solution which can resist mechanical shock loads, and movement due to air pressure differentials or rotational inertial forces.

In certain embodiments, the fan isolation system is included within a fan module such as a 60 mm fan module used in blade type server information handling systems. In certain embodiments, such a fan isolation system can reduce fan energy from the fan module to the chassis up to 80%. In certain embodiments, the fan isolation system is included within a fan module for use in a modular chassis, but could be modified to work in other systems, such as rack server type information handling systems where a fan is designed to fit into a fan bay. Additionally, the fan isolation system can be scaled to different fan shapes & sizes.

In certain embodiments, the information handling system 100 may comprise a server chassis configured to house a plurality of servers or "blades." In other embodiments, the information handling system 100 may comprise a personal computer (e.g., a desktop computer, laptop computer, mobile computer, and/or notebook computer). In yet other embodiments, information handling system 100 may comprise a storage enclosure configured to house a plurality of physical disk drives and/or other computer-readable media for storing data. In certain embodiments, the information handling system 100 may include a plurality of fan assemblies 150.

Figure 2:
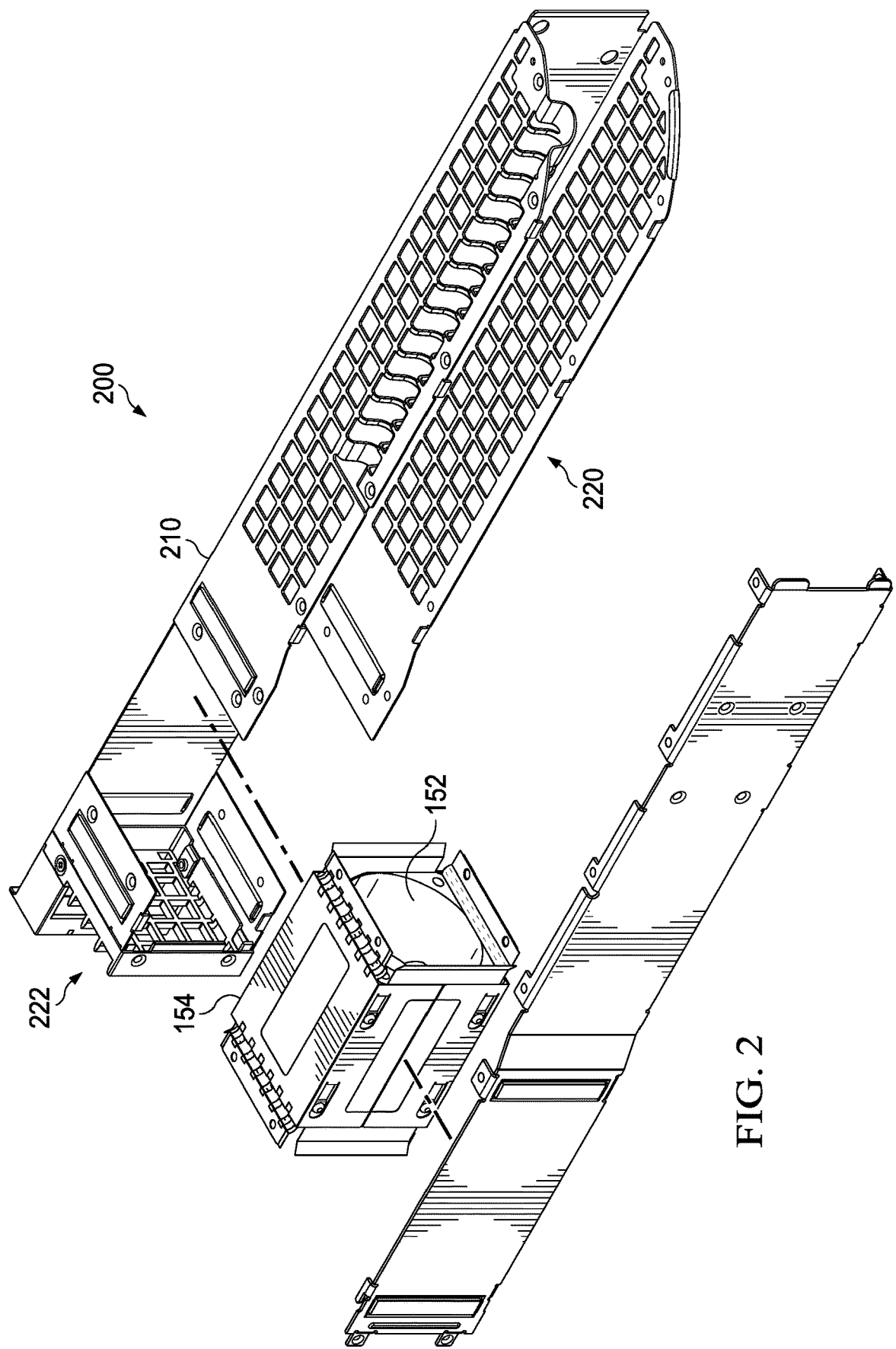
FIG. 2 shows an exploded view of a fan assembly having a fan isolation system in accordance with the present invention.

In certain embodiments, the chassis 160 comprises an enclosure that serves as a container for various information handling systems and information handling resources, and may be constructed from steel, aluminum, plastic, and/or any other suitable material. Although the term "chassis" is used, the chassis 160 may also be referred to as a case, cabinet, tower, box, enclosure, and/or housing. In certain embodiments, the chassis 160 may be configured to hold and/or provide power to a plurality of information handling systems and/or information handling resources FIG. 2 shows an exploded view of a fan assembly 200 having a fan isolation system in accordance with the present invention. The fan assembly 200 includes a fan carrier 210, a fan 152 and a fan isolation system 154. In certain embodiments, the fan carrier 210 includes an intake portion 220 and an output portion 222. The fan 152 and fan isolation system 154 are mounted between the intake portion 220 and the output portion 222.

Figure 3:
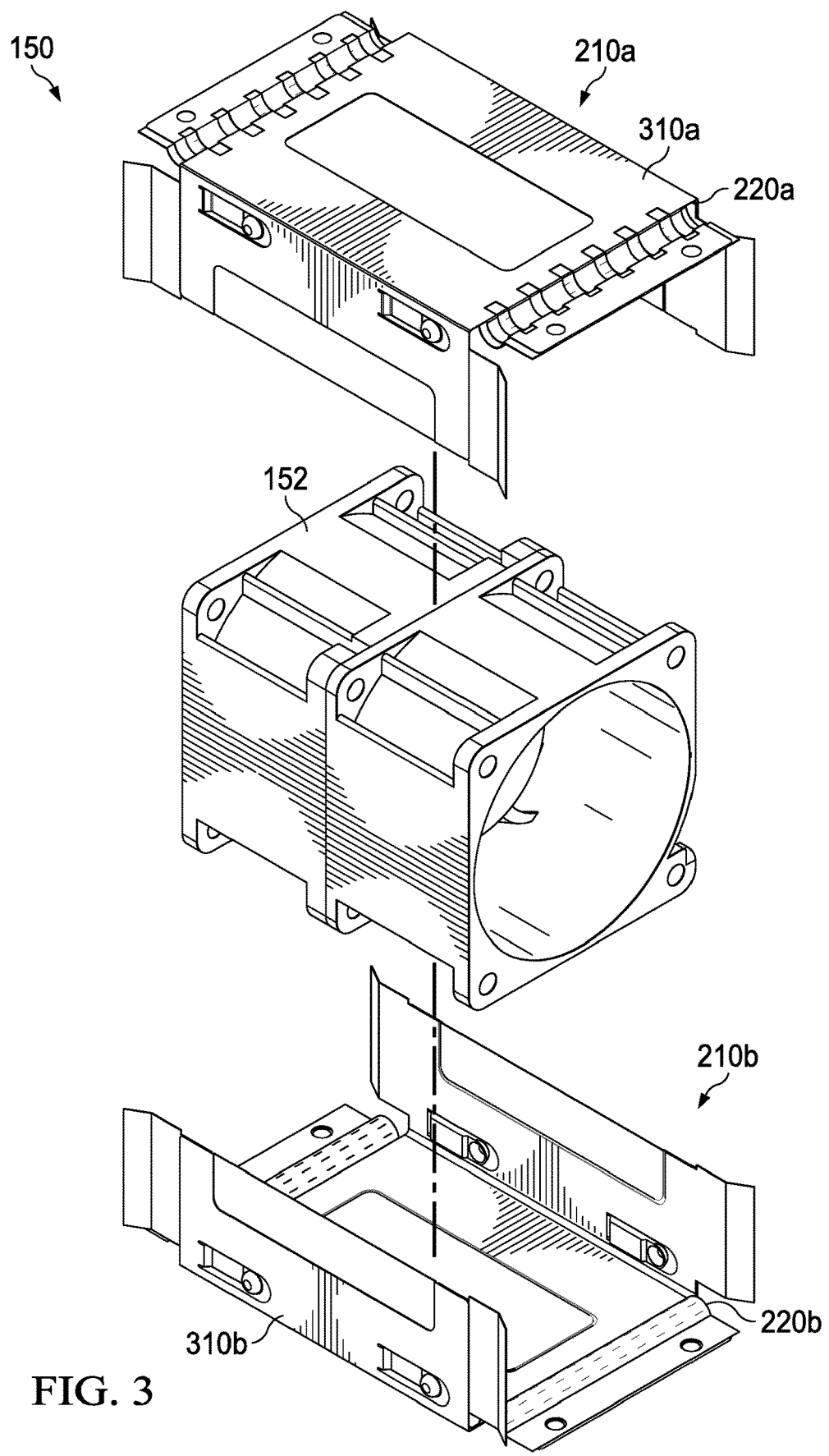
FIG. 3 shows an exploded view of a fan and fan isolation system.
Figure 4:
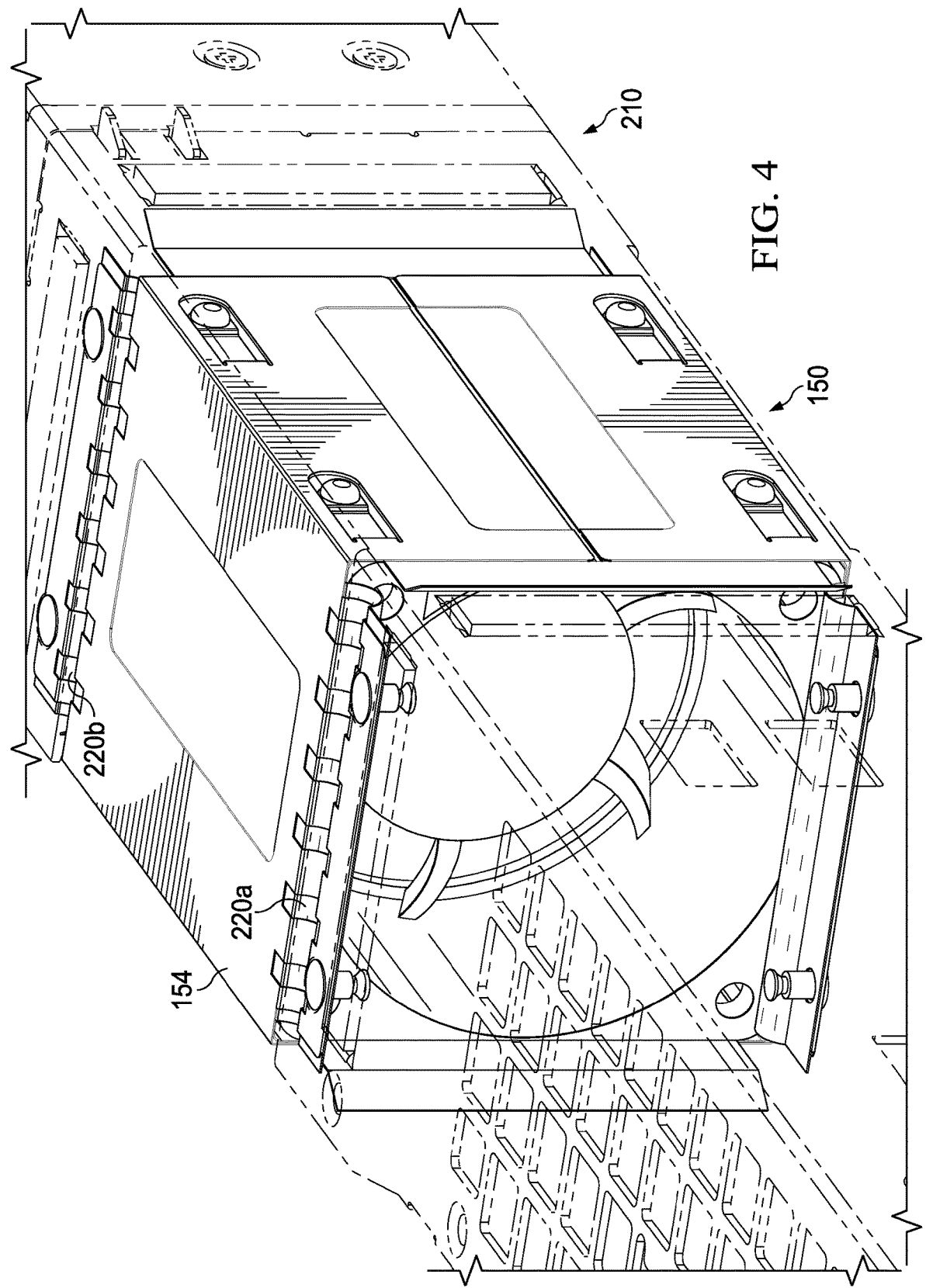
FIG. 4 shows a perspective view of a fan mounted within a fan isolation system.

FIG. 3 shows an exploded view of a fan 150 and fan isolation system 154. FIG. 4 shows a perspective view of a fan 150 mounted within a fan isolation system 154.

In certain embodiments, the fan 150 is mounted within the fan isolation assemblies such that the fan is substantially contiguous with first and second isolation spring elements 220a, 220b of the first fan isolation assembly 210a and the second fan isolation assembly 210b, respectively. The fan isolation system 154 provides mechanical isolation via low frequency tuned spring elements. In certain embodiments, the spring elements are tuned to push most of the transmitted energy to lower than one hundred Hz. In certain embodiments, the fan isolation system 154 is mounted within the fan carrier 210 such that at least some of the walls of the fan isolation system 154 are substantially continuous with respective walls of the fan carrier 210 (i.e., with less than 10% difference between the outside dimensions of the walls fan isolation system and the walls of the outside dimensions of the fan carrier). In certain embodiments, the at least some of the walls of the fan isolation system 154 include the walls of the fan isolation system 154 via which the fan isolation system 154 is attached to the carrier 210. In certain embodiments, other walls of the fan isolation system 154 abut respective walls of the fan carrier 210. In certain embodiments, the other walls include walls of the fan isolation system 154 that do not attach the fan isolation system 154 to the fan carrier 210. In certain embodiments, the walls of the fan isolation system 154 which are not intended to be spring connections do not touch the fan carrier 210. Similarly, the fan 150 is mounted so as to not touch the fan carrier 210. By so mounting the fan isolation system 154, isolation between the fan 150 and the fan carrier 210 and chassis 160 is maximized.

The fan isolation system 154 includes a pair of fan isolation carrier assemblies 310. In certain embodiments, the fan isolation assemblies 310 are identical. In certain embodiments, a first fan isolation assembly 310a is attached to a first half of the fan 150 and a second fan isolation assembly 310b is attached to a second half of the fan 150. In certain embodiments the first fan isolation assembly 310a is attached to the top half of the fan 150 and the second fan isolation assembly 310b is attached to the bottom half of the fan 150. In certain embodiments, each of the fan isolation carrier assemblies 310 are attached to the fan via adhesive. In certain embodiments, adhesive may not be necessary if the fan isolation assembly 310 is configured (e.g., folded) such that the fan is retained by features of the fan isolation assembly 212.

Figure 5:
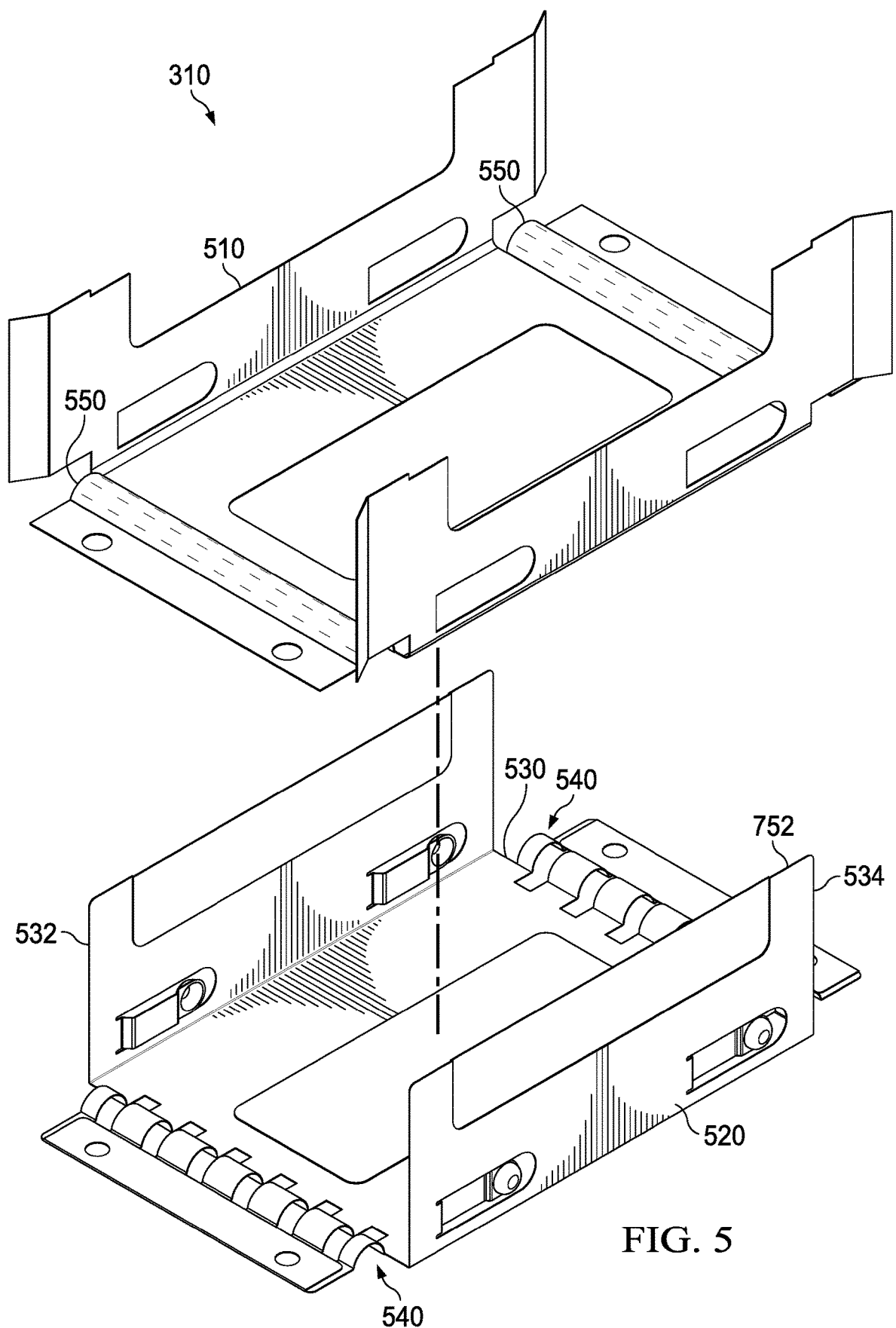
FIG. 5 shows an exploded view of a fan isolation system component.

FIG. 5 shows an exploded view of a fan isolation assembly 310. The fan isolation assembly 310 includes a thermal duct portion 510 and an isolation portion 520. In certain embodiments, the isolation portion 520 includes a main portion 530, a first side portion 532 and a second side portion 534 where the first side portion 532 and the second side portion 534 extend perpendicularly from the main portion. In certain embodiments, the isolation portion includes a plurality of isolation spring elements 540. In certain embodiments, the thermal duct portion 510 is configured to fit within the isolation portion 520. In certain embodiments, the thermal duct portion comprises a plurality of curved portion 550 which fit within respective curved portions of the isolation spring element 540. The thermal duct portion 510 performs a thermal sealing function for the fan isolation assembly 220. The isolation portion 520 performs a vibration isolation function for the fan isolation assembly 220. Additionally, in certain embodiments, the isolation portion 520 provides structural integrity for the fan isolation assembly 220.

Figure 6:
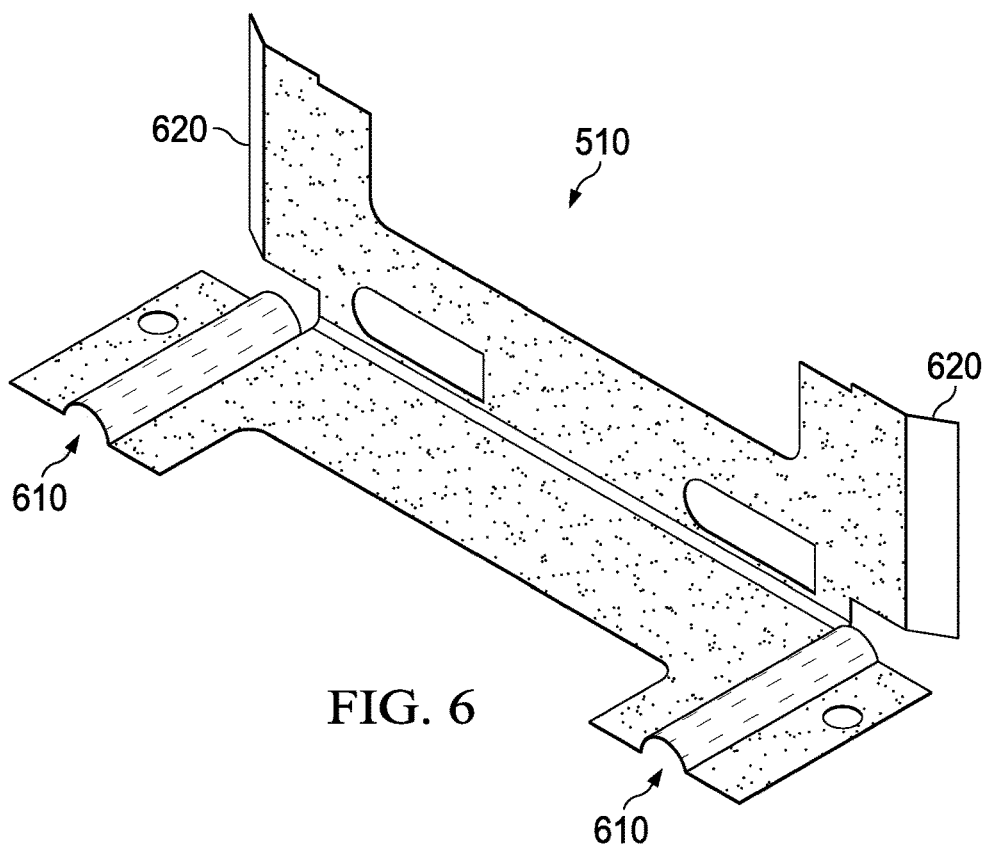
FIG. 6 shows a cut away perspective view of a portion of a thermal duct portion of a fan isolation system.

FIG. 6 shows a cut away perspective view of a portion of a thermal duct portion 510 of a fan isolation system 154. The thermal duct portion 510 provides an airflow seal between the fan 150 and the components of the information handling system. In certain embodiments, the thermal duct portion 510 is formed using a thermoplastic resin configured such that air gaps between the fan and the chassis are minimized. In certain embodiments, the thermoplastic resin comprises Polyethylene terephthalate (available under the trade designation of Mylar). In certain embodiments, the thermoplastic resin is folded to minimize air gaps.

In certain embodiments, the thermal duct portion 510 includes curved portions 610 which correspond to respective spring elements of the isolation portion 520. Thus, the curved portions 610 wrap around the curved portion of each spring element. Providing the curved portions enables the thermal duct portion 510 to seal the air gaps that are present within the spring elements. This sealing stops air from escaping via the air gaps of the spring elements.

In certain embodiments, the thermal duct portion 510 includes flaps 620. The flaps 620 are configured to be loaded against the walls of the fan carrier to thermally seal the fan isolation system 154 against the side walls of the fan assembly housing. In certain embodiments, the thermal isolation portion includes flaps 620. The flaps 620 include mounting holes through which the fan isolation system 154 is mounted to the top and bottom of the fan carrier. The flaps 620 also thermally seal the fan isolation system 154 against the top and bottom walls of the fan carrier.

Figure 7:
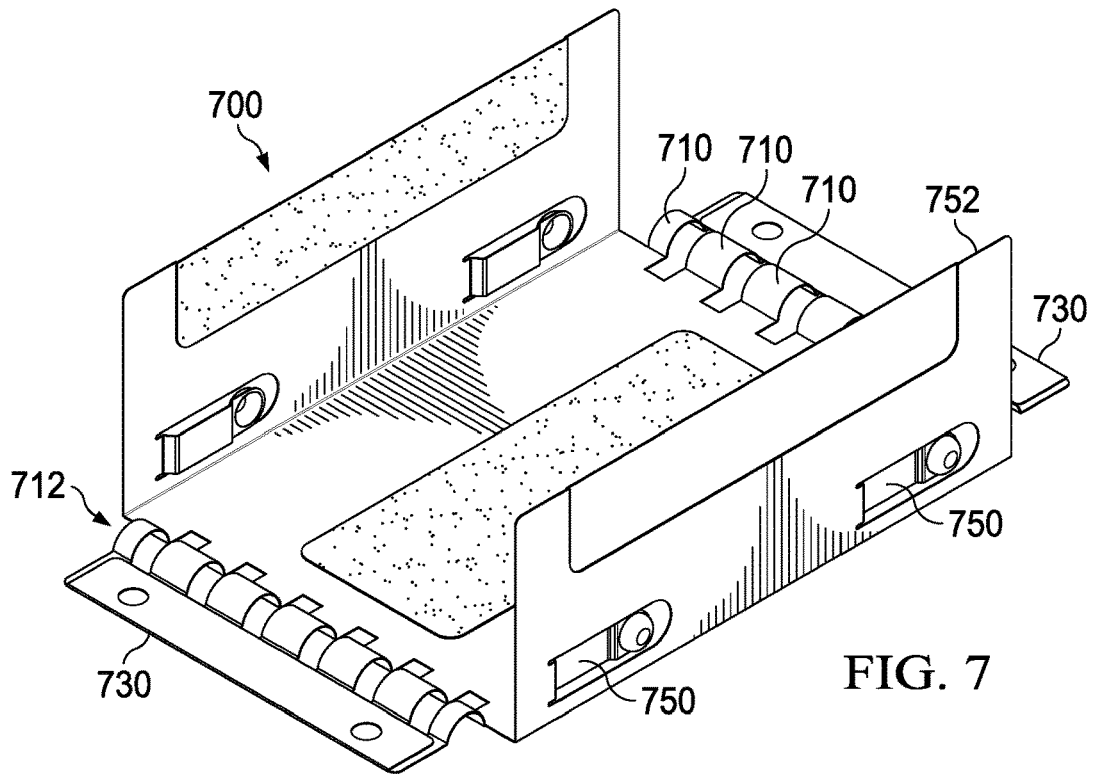
FIG. 7 shows a perspective view of a spring portion of a fan isolation system.

FIG. 7 shows a perspective view of a mechanical isolation portion 700 of a fan isolation system. The mechanical isolation portion 700 includes a plurality of isolation spring elements 710. Each of the isolation spring elements 710 may be tuned by adjusting one or more variables including the geometry of the arc of each curved portion 712 of the isolation spring element, the distance between each curved portion of the isolation spring element for each isolation spring element, the weight of each curved portion of the isolation spring element for each isolation spring element, the length of each curved portion of the isolation spring element for each isolation spring element, the width of each curved portion of the isolation spring element for each isolation spring element, the number of curved portions of the isolation spring element for each isolation spring element, and the amount of open area for each isolation spring element. In certain embodiments, each spring element 710 may be individually tuned.

In certain embodiments, the isolation portion 520 is constructed of sheet metal such as 0.2 mm thick sheet metal. In certain embodiments, each isolation portion 520 is constructed from single piece of sheet metal. In certain embodiments, each isolation spring element 710 is formed by removing portions of the sheet metal to create a plurality of open areas contiguous to a plurality of connecting portions of the sheet metal. The connecting portions of the sheet metal connect a fan portion 720 of the isolation portion with an attachment portion 730 of the sheet metal. The connecting portions are then bent to form each curved portion 740 of the isolation spring element.

In certain embodiments, the fan isolation system further includes leaf springs 750 along some of the walls of the isolation portion 520. In certain embodiments, the leaf springs 750 are positioned on the walls 752 perpendicular to at least one isolation spring element 710. In certain embodiments, each perpendicular wall 752 includes a plurality of leaf springs 750. In certain embodiments, the leaf springs 750 are constructed so as to be loaded against the corresponding walls of the fan carrier 210.

Figure 8:
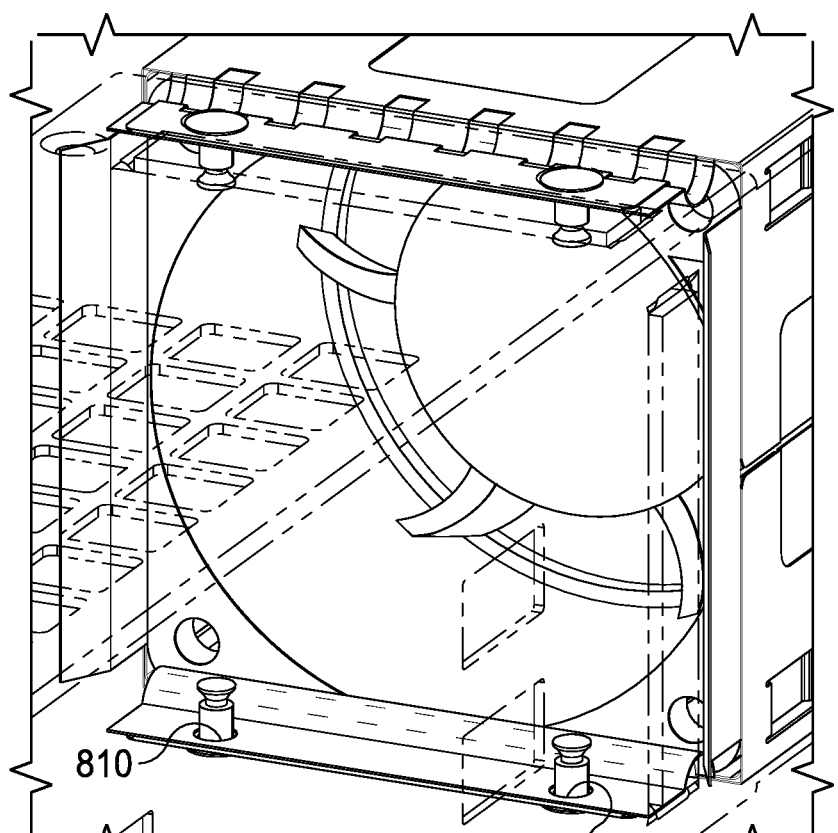
FIG. 8 shows a detail view of a portion of a fan isolation system.

FIG. 8 shows a detail view of a portion of a fan isolation system. More specifically in certain embodiments, the fan isolation system 154 includes a plurality of attachment locations 810 via which the fan isolation system 154 is attached to the fan carrier. In certain embodiments mechanical fasteners attach the fan isolation system 154 to the fan carrier. In certain embodiments, the mechanical fasteners comprise permanent mechanical fasters (e.g., rivets) and/or removable mechanical fasteners (e.g., screws). In certain embodiments, the attachment location 810 comprises apertures into which mechanical fasteners are secured to attach the fan isolation system 154 to the fan carrier 210.

Figure 9:
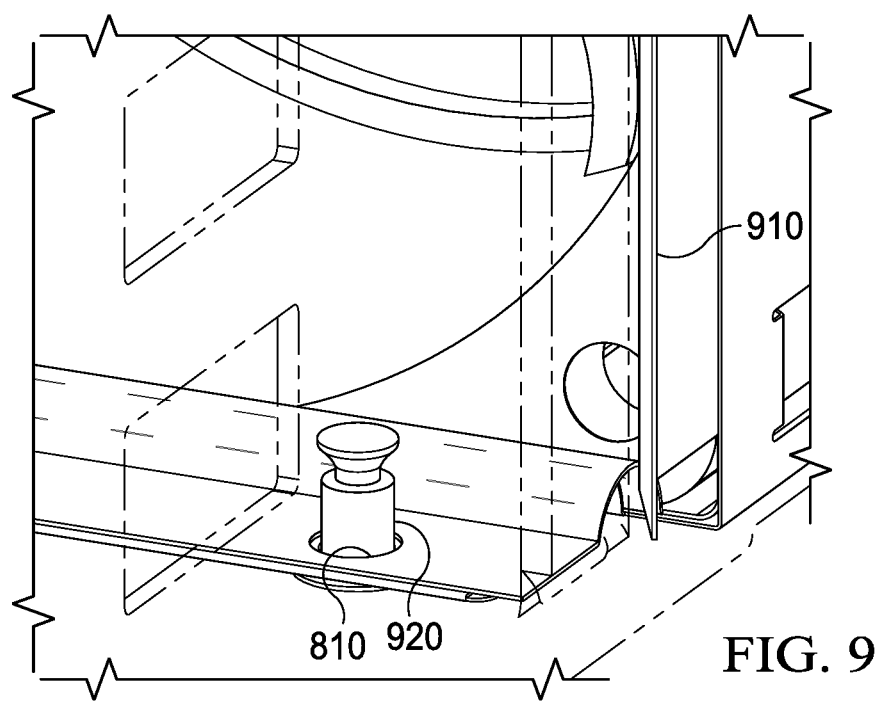
FIG. 9 shows a detail view of a portion of a fan isolation system.

FIG. 9 shows a detail view of a portion of a fan isolation system. More specifically, the thermal duct portion 510 of the fan isolation system 154 include one or more bendable wings 910 (i.e., flaps). Each of the bendable wings 910 may be pre-bent to load the flaps of the fan isolation system 154 against inside walls of the fan carrier 210. In certain embodiments, the bendable wings 910 seal the fan isolation system against the side walls of the fan carrier 210.

In certain embodiments, bendable wings 910 seal the fan isolation system 154 against either or both the top wall and the bottom wall of the fan carrier 210. In other embodiments, the fan isolation system 154 is sealed against either or both the top wall and the bottom wall via the mechanical fasteners 920.

In certain embodiments, the fan isolation system 154 further includes a damping portion at the interface between the fan carrier and the chassis to provide additional vibration reduction across a broader frequency range. In certain embodiments the damping portion comprises a strip of damping material (e.g., any material with damping properties) can be added at the interface between the carrier and chassis. In certain embodiments the damping material comprises a thermoplastic type material such as an EAR Isodamp C-1000 series material.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A fan isolation assembly comprising: a first fan isolation carrier assembly and a second fan isolation carrier assembly, the first fan isolation carrier assembly being attached to a first half of a fan, the second fan isolation carrier assembly being attached to a second half of the fan, each of the first fan isolation carrier assembly and the second fan isolation carrier assembly comprising: a mechanical isolation portion, the mechanical isolation portion comprising a main portion, a first side portion and a second side portion, the first side portion extending perpendicularly from the main portion, the second side portion extending perpendicularly from the main portion, the main portion comprising an isolation spring element, the mechanical isolation portion performing a vibration isolation function for the fan isolation assembly, the fan being mounted within the first fan isolation carrier assembly and the second fan isolation carrier assembly such that the fan is substantially contiguous with the isolation spring element of the first fan isolation carrier assembly and the second fan isolation carrier assembly, the isolation spring element extending laterally across the main portion of the mechanical isolation portion from the first side portion to the second side portion, the isolation spring element comprising a plurality of curved portions, the isolation spring element abutting a front portion of the fan; and, a thermal duct portion, the thermal duct portion being configured to fit within the mechanical isolation portion, the thermal duct portion performing a thermal ducting function for the fan isolation assembly, the thermal duct portion comprising a curved portion, the curved portion fitting within the plurality of curved portions of the isolation spring element.

2. The fan isolation assembly of claim 1, wherein:
the mechanical isolation portion provides structural integrity for the fan isolation assembly.

3. The fan isolation assembly of claim 1, wherein:
the isolation spring element is tuned by adjusting at least one physical characteristic of the isolation spring element.

4. The fan isolation assembly of claim 3, wherein: the physical characteristic comprises at least one of a geometry of an arc of the curved portion of the isolation spring element, a distance between each of the plurality of curved portions of the isolation spring element for each isolation spring element, a weight of each curved portion of the isolation spring element for each isolation spring element, a length of each curved portion of the isolation spring element for each isolation spring element, a width of each curved portion of the isolation spring element for each isolation spring element, a number of curved portions of the isolation spring element for each isolation spring element, and an amount of open area for each isolation spring element.

5. The fan isolation assembly of claim 1, wherein further comprising:
a thermal isolation portion, the thermal isolation portion providing thermal airflow sealing around the fan.

6. The fan isolation assembly of claim 5, wherein:
the thermal isolation portion comprises a bendable wing, the bendable wing being pre-bent to load the wing of the fan isolation system against an inside wall of a fan carrier.

7. A system comprising: a processor; a data bus coupled to the processor; and a non-transitory, computer-readable storage medium coupled to the bus; and a fan assembly, the fan assembly comprising: a fan carrier; a fan; and, a fan isolation system, the fan isolation system comprising: a fan isolation assembly attached to the fan, the fan isolation assembly comprising a first fan isolation carrier assembly and a second fan isolation carrier assembly, the first fan isolation carrier assembly being attached to a first half of the fan, the second fan isolation carrier assembly being attached to a second half of the fan, each of the first fan isolation carrier assembly and the second fan isolation carrier assembly comprising a mechanical isolation portion, the mechanical isolation portion comprising a main portion, a first side portion and a second side portion, the first side portion extending perpendicularly from the main portion, the second side portion extending perpendicularly from the main portion, the main portion comprising an isolation spring element, the mechanical isolation portion performing a vibration isolation function for the fan isolation assembly, the fan being mounted within the first fan isolation carrier assembly and the second fan isolation carrier assembly such that the fan is substantially contiguous with the isolation spring element of the first fan isolation carrier assembly and the second fan isolation carrier assembly, the isolation spring element extending laterally across the main portion of the mechanical isolation portion from the first side portion to the second side portion, the isolation spring element comprising a plurality of curved portions, the isolation spring element abutting a front portion of the fan; and, a thermal duct portion, the thermal duct portion being configured to fit within the mechanical isolation portion, the thermal duct portion performing a thermal ducting function for the fan isolation assembly, the thermal duct portion comprising a curved portion, the curved portion corresponding to the plurality of curved portions of the isolation spring element.

8. The system of claim 7, wherein:
the mechanical isolation portion provides structural integrity for the fan isolation assembly.

9. The system of claim 7, wherein:
the isolation spring element is tuned by adjusting at least one physical characteristic of the isolation spring element.

10. The system of claim 9, wherein: the physical characteristic comprises at least one of a geometry of an arc of the curved portion of the isolation spring element, a distance between each of the plurality of curved portions of the isolation spring element for each isolation spring element, a weight of each curved portion of the isolation spring element for each isolation spring element, a length of each curved portion of the isolation spring element for each isolation spring element, a width of each curved portion of the isolation spring element for each isolation spring element, a number of curved portions of the isolation spring element for each isolation spring element, and an amount of open area for each isolation spring element.

11. The system of claim 7, further comprising:
a thermal isolation portion, the thermal isolation portion providing thermal airflow sealing around the fan.

12. The system of claim 7, wherein:
the thermal isolation portion comprises a bendable wing, the bendable wing being pre-bent to load the wing of the fan isolation system against an inside wall of a fan carrier.

13. A fan isolation system comprising: a fan; and, a fan isolation assembly attached to the fan, the fan isolation assembly comprising a first fan isolation carrier assembly and a second fan isolation carrier assembly, the first fan isolation carrier assembly being attached to a first half of the fan, the second fan isolation carrier assembly being attached to a second half of the fan, each of the first fan isolation carrier assembly and the second fan isolation carrier assembly comprising a mechanical isolation portion, the mechanical isolation portion comprising a main portion, a first side portion and a second side portion, the first side portion extending perpendicularly from the main portion, the second side portion extending perpendicularly from the main portion, the main portion comprising an isolation spring element, the mechanical isolation portion performing a vibration isolation function for the fan isolation assembly, the fan being mounted within the first fan isolation carrier assembly and the second fan isolation carrier assembly such that the fan is substantially contiguous with the isolation spring element of the first fan isolation carrier assembly and the second fan isolation carrier assembly, the isolation spring element extending laterally across the main portion of the mechanical isolation portion from the first side portion to the second side portion, the isolation spring element comprising a plurality of curved portions, the isolation spring element abutting a front portion of the fan; and, a thermal duct portion, the thermal duct portion being configured to fit within the mechanical isolation portion, the thermal duct portion performing a thermal ducting function for the fan isolation assembly, the thermal duct portion comprising a curved portion, the curved portion corresponding to the plurality of curved portions of the isolation spring element.

14. The fan isolation system of claim 13, wherein:
the mechanical isolation portion provides structural integrity for the fan isolation assembly.

15. The fan isolation system of claim 13, wherein:
the isolation spring element is tuned by adjusting at least one physical characteristic of the isolation spring element.

16. The fan isolation system of claim 15, wherein: the physical characteristic comprises at least one of a geometry of an arc of the curved portion of the isolation spring element, a distance between each of the plurality of curved portions of the isolation spring element for each isolation spring element, a weight of each curved portion of the isolation spring element for each isolation spring element, a length of each curved portion of the isolation spring element for each isolation spring element, a width of each curved portion of the isolation spring element for each isolation spring element, a number of curved portions of the isolation spring element for each isolation spring element, and an amount of open area for each isolation spring element.

17. The fan isolation system of claim 13, further comprising:
a thermal isolation portion, the thermal isolation portion providing thermal airflow sealing around the fan.

18. The fan isolation system of claim 13, wherein:
the thermal isolation portion comprises a bendable wing, the bendable wing being pre-bent to load the wing of the fan isolation system against an inside wall of a fan carrier.

* * * * *